(12) United States Patent
Dilo

(10) Patent No.: US 10,745,201 B2
(45) Date of Patent: Aug. 18, 2020

(54) OUTPUT CONVEYOR BELT OF A CROSSLAPPER

(71) Applicant: Oskar Dilo Maschinenfabrik KG, Eberbach (DE)

(72) Inventor: Johann Philipp Dilo, Eberbach (DE)

(73) Assignee: Oskar Dilo Maschinenfabrik KG, Eberbach (DE)

(*) Notice: Subject to any disclaimer, the term of this patent is extended or adjusted under 35 U.S.C. 154(b) by 0 days.

(21) Appl. No.: 16/554,758

(22) Filed: Aug. 29, 2019

(65) Prior Publication Data
US 2020/0071083 A1 Mar. 5, 2020

(30) Foreign Application Priority Data
Aug. 29, 2018 (EP) .................................. 18191459

(51) Int. Cl.
| | |
|---|---|
| *B65G 15/52* | (2006.01) |
| *D04H 1/74* | (2006.01) |
| *B65G 45/18* | (2006.01) |
| *B65G 17/08* | (2006.01) |
| *D21H 27/00* | (2006.01) |

(52) U.S. Cl.
CPC ............. *B65G 15/52* (2013.01); *B65G 17/08* (2013.01); *B65G 45/18* (2013.01); *D04H 1/74* (2013.01); *D21H 5/26* (2013.01)

(58) Field of Classification Search
CPC .... B65G 45/18; B65G 21/2063; B65G 15/00; B65G 17/06; B65G 17/08; B65G 17/40; B65G 15/52; D03D 3/04; D01G 25/00; D04H 1/74; D21H 5/26

USPC .................................................. 198/850–853
See application file for complete search history.

(56) References Cited

U.S. PATENT DOCUMENTS

| | | | | |
|---|---|---|---|---|
| 1,554,838 | A |  | 9/1925 | Bokum et al. |
| 2,303,386 | A | * | 12/1942 | Peterson ............... A46B 13/006 15/182 |
| 3,139,975 | A | * | 7/1964 | Schaefer ................ B65G 45/18 198/496 |
| 4,356,587 | A | * | 11/1982 | Holding ................... A46B 3/14 15/199 |
| 4,741,941 | A | * | 5/1988 | Englebert ............... A47L 13/16 15/209.1 |
| 2005/0115808 | A1 | * | 6/2005 | Fatato .................... B65G 17/38 198/850 |
| 2013/0270075 | A1 | * | 10/2013 | Balsells Mercade .. B65G 15/58 198/851 |

(Continued)

FOREIGN PATENT DOCUMENTS

| | | |
|---|---|---|
| DE | 76 457 C | 8/1894 |
| DE | 12 92 549 B | 4/1969 |

(Continued)

OTHER PUBLICATIONS

EP 18 19 1459 Search Report dated Jan. 31, 2019.

*Primary Examiner* — James R Bidwell
(74) *Attorney, Agent, or Firm* — Jansson Munger McKinley & Kirby Ltd.

(57) ABSTRACT

The output conveyor belt of a crosslapper for holding and conveying layers of card web laid to form a nonwoven is configured as an endless slatted belt with a plurality of transverse slats. The transverse slats comprise support surfaces for the nonwoven, which are formed by fibers or bristles projecting from the transverse slats.

13 Claims, 5 Drawing Sheets

(56) References Cited

U.S. PATENT DOCUMENTS

2015/0183584 A1* 7/2015 Marshall ................ B65G 17/46
198/850
2017/0088358 A1* 3/2017 Dilo ....................... B65G 15/00

FOREIGN PATENT DOCUMENTS

IE      295 18 917 U1    2/1996
SU         825 707 A1    4/1981

* cited by examiner

OUTPUT CONVEYOR BELT OF A CROSSLAPPER

FIELD OF THE INVENTION

The invention relates to an output conveyor belt of a crosslapper. In the production of nonwovens in a crosslapper, several layers of a card web entering the crosslapper are laid on top of each other on an output conveyor belt movable in the direction perpendicular to the direction of the laying carriage. Because the movements of the laying carriage and those of the output conveyor belt are perpendicular to each other, the edges of the individual layers of the card web in the laid nonwoven on the output conveyor belt are slightly slanted. Overall, several layers of card web are laid down on top of each other in zigzag fashion, as a result of which the nonwoven consisting of these several layers of card web is formed.

As a result of varying requirements, it can be desirable for the card web to be intentionally stretched upstream from the crosslapper or as it passes through the crosslapper. For example, this is advantageous as a way of laying thinner sections of the card web in the area of the side edges of the laid nonwoven, which leads to a more uniform nonwoven after the solidification step. Nevertheless, because of the elastically stored strain of the card web, a certain level of intrinsic stress in the material results from the deformations. These intrinsic stresses can result in the distortion of the laid nonwoven; they can, for example, cause the most recently laid layer of card web to contract elastically, which has the effect of reducing the lay-down width. Especially at the rear edge of the most recently laid layer of card web, some of the card web can land directly on the transverse slats of the output conveyor belt. This is where the effect is especially conspicuous.

SUMMARY OF THE INVENTION

It is an object of the present invention to provide an output conveyor belt of a crosslapper which effectively counteracts the contraction of the laid nonwoven resulting from intrinsic stresses in the nonwoven and simultaneously treats the laid nonwoven gently and releases it again with as little residue as possible during the transfer of the nonwoven from the output conveyor belt to a downstream conveying device.

According to an aspect of the invention, the output conveyor belt of a crosslapper for supporting and conveying layers of card web laid to form a nonwoven is configured as an endless slatted belt with a plurality of transverse slats. The transverse slats comprise support surfaces for the nonwoven, wherein at least certain areas of the support surfaces of at least some of the transverse slats are formed by projecting fibers or bristles.

With this configuration, it is guaranteed that the laid edges of the card web layers do not contract as the nonwoven is being laid. At the same time, the scratching of the smooth, sensitive surface of the laying belts of the crosslapper, which can come in partial contact with the output conveyor belt, is avoided. Finally, it is guaranteed that, as a result of the increased frictional and interlocking forces between the nonwoven and the output conveyor belt, the dimensional stability of the nonwoven is ensured until it is transferred to the next conveying apparatus.

The transverse slats are preferably covered at least partially by a covering which comprises projecting fibers or bristles.

The covering preferably also comprises a backing layer, from which the fibers or bristles project.

The fibers preferably project from the backing layer by a distance in the range of 0.5-5 mm, more preferably of 1.0-4.0 mm.

The covering is preferably formed out of a pile fabric with projecting fibers. In preferred embodiments, the pile fabric is a velvet or a velour.

In alternative embodiments, the fibers can be applied in the form of fiber flocking to the backing layer.

The backing layer can comprise at least one adhesive layer so that it can be attached easily to the transverse slats.

In a preferred embodiment, each transverse slat is covered by the covering. Alternatively, only every second or every third transverse slat is covered by the covering.

In a first variant, the transverse slats are equipped with fibers or bristles over the entire width of the output conveyor belt.

In an alternative variant, the transverse slats comprise a covering in outer areas, whereas a middle area of the transverse slats is not covered by the covering. This can be sufficient, because the distortions occur primarily at the edges of the laid nonwoven web. If the nonwoven is prevented from contracting there, the middle area of the laid nonwoven web is thus also held in place.

This free middle area preferably extends over no more than 70%, more preferably over no more than 60%, and even more preferably over no more than 50% of the width of the output conveyor belt.

In addition to the embodiments with a covering over the transverse slats, it is also possible for bristles to be present in the form of bristle bundles and for these to be attached preferably directly to the transverse slats.

In a preferred embodiment, a cleaning device for removing adhering nonwoven fibers is arranged in an area of the output conveyor belt. Because of the relatively high frictional and interlocking forces of the output conveyor belt, fibers of the nonwoven can continue to adhere to the fibers or bristles of the output conveyor belt even after the nonwoven has been transferred from the output conveyor belt to the downstream conveyor unit. It can therefore be necessary to remove these adhering fibers of the nonwoven, so that the output conveyor belt is again able to provide the desired holding force for the nonwoven during the next laying process on these transverse slats.

In preferred embodiments, the cleaning device can comprise a brush roller and/or a suction device.

DETAILED DESCRIPTION OF SPECIFIC EMBODIMENTS

Figure 1:
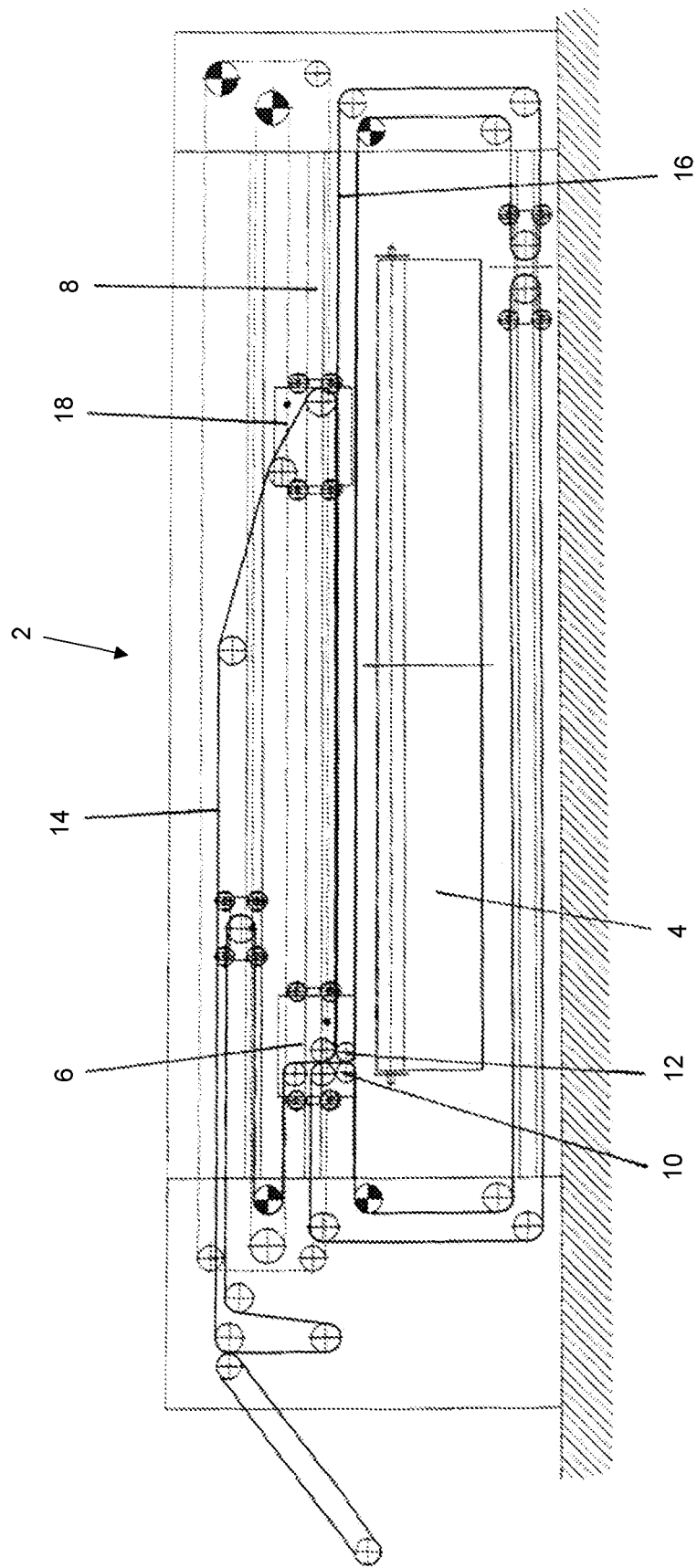
FIG. 1 shows a schematic side view of a crosslapper with an embodiment of an output conveyor belt according to the invention.

FIG. 1 shows a schematic view of a crosslapper 2, with the end of an output conveyor belt 4 facing the observer. The endless output conveyor belt 4 is designed to carry away a laid nonwoven 3 in a transport direction T (see FIG. 3), which is perpendicular to the plane of the drawing. Above the output conveyor belt 4, a laying carriage 6 can be moved back and forth on rails or tubes 8. In the laying carriage 6, a laying nip for the card web (not shown) is formed between two rollers 10, 12. The card web is guided through crosslapper 2 to this laying nip by at least two card web transport belts 14, 16. In the present example, crosslapper 2 is configured as a horizontal layer, in which an upper carriage 18 is arranged substantially on the same level as laying carriage 6 and is also supported movably back and forth transversely to the transport direction of the output conveyor belt 4 on rails or tubes 8. Rails or tubes 8 can be the same rails or tubes on which laying carriage 6 is also movably supported. In operation, when laying carriage 6 is executing a back-and-forth movement above output conveyor belt 4, upper carriage 18 moves in the same direction but more slowly.

The movements of laying carriage 6 and of upper carriage 18 are coordinated with each other in such a way that, as the card web is being fed into crosslapper 2, layers of card web can be deposited onto output conveyor belt 4 in a controlled manner within the illustrated crosslapper 2. As this is happening, upper carriage 18 moves in the same direction as laying carriage 6 but on average only half as fast. It is also taken into account that laying carriage 6 must be braked to a halt and then accelerated again in the area of its reversal point. If the card web enters at varying speeds, perhaps because a stretching device (not shown), in particular a cyclically operating web drafter, is installed upstream of crosslapper 2 to produce a varying thickness in the card web for the purpose of achieving a transverse profiling of laid nonwoven 3, a card web buffering zone can be provided within crosslapper 2 in a known manner by controlling the movement of upper carriage 18 and the movement of laying carriage 6 independently of each other. It is also possible to draft the card web within crosslapper 2 by coordinated movements of upper carriage 18 and laying carriage 6.

According to the exemplary embodiment shown in FIG. 1, three card web conveyor belts are present in crosslapper 2 in addition to output conveyor belt 4. The invention can also be applied, however, to any other type of crosslapper, including those with two card web conveyor belts. The invention can also be applied to contrary-motion crosslappers, in which upper carriage 18 and laying carriage 6 move in opposite directions and also to camelback crosslappers.

Common to all crosslappers 2 is that laying carriage 6 must be braked to a halt and then accelerated again in the opposite direction at its reversal points. During the braking and accelerating phase, the speed of card web deposition is also reduced correspondingly in modern crosslappers 2 in order to prevent the edges of the laid nonwoven 3 from becoming too thick. At the same time, output conveyor belt 4 is adapted in a controlled manner to these cyclic movements and therefore also becomes correspondingly slower at the times when laying carriage 6 is braked to a halt and accelerated again in the opposite direction. This is necessary to guarantee that the layers of card web line up precisely at the edges of the nonwoven. The speed of output conveyor belt 4 can drop to zero. Overall, therefore, output conveyor belt 4 moves in cyclical fashion with variable speed patterns.

Figure 2:
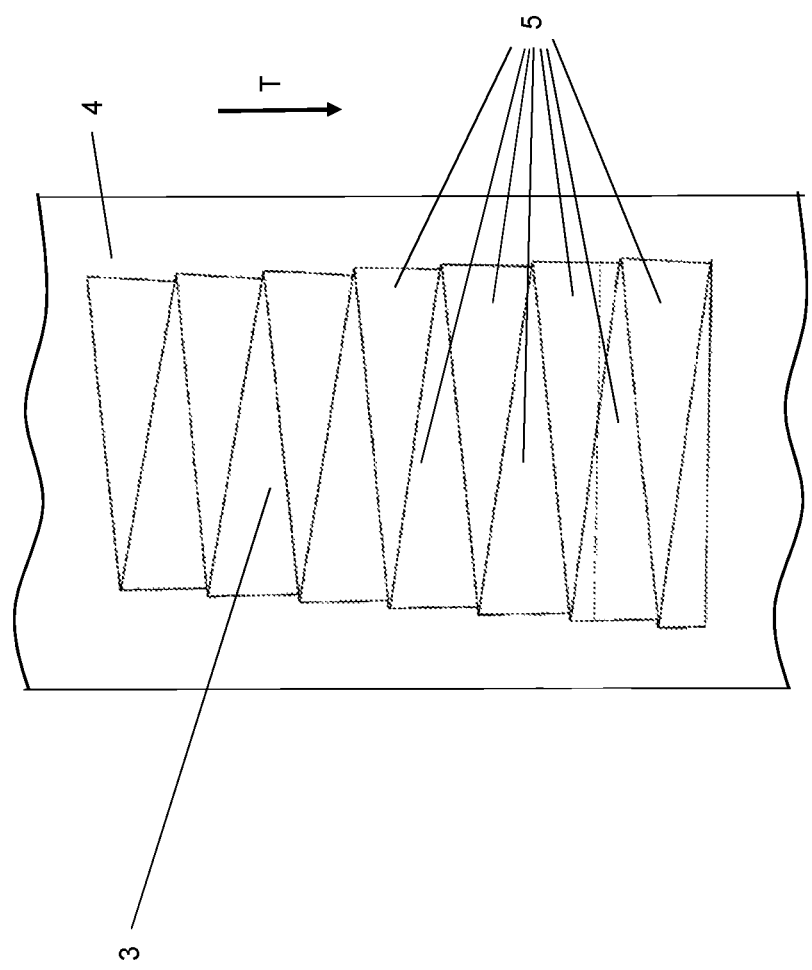
FIG. 2 shows a schematic top view of an output conveyor belt, in which an undesirable contraction of the edges of the nonwoven is illustrated schematically.

As shown in FIG. 2, during the zigzag deposition of the card web layers 5 onto output conveyor belt 4, it is possible for the most recently laid card web layer 5 to contract undesirably as previously described as a result of the intrinsic stress in the fiber material.

According to the invention, however, it would be desirable to change the configuration shown in FIG. 2 in such a way that all of the card web layers 5 extend over the same width, i.e., over the starting width shown at the bottom of FIG. 2.

Figure 3:
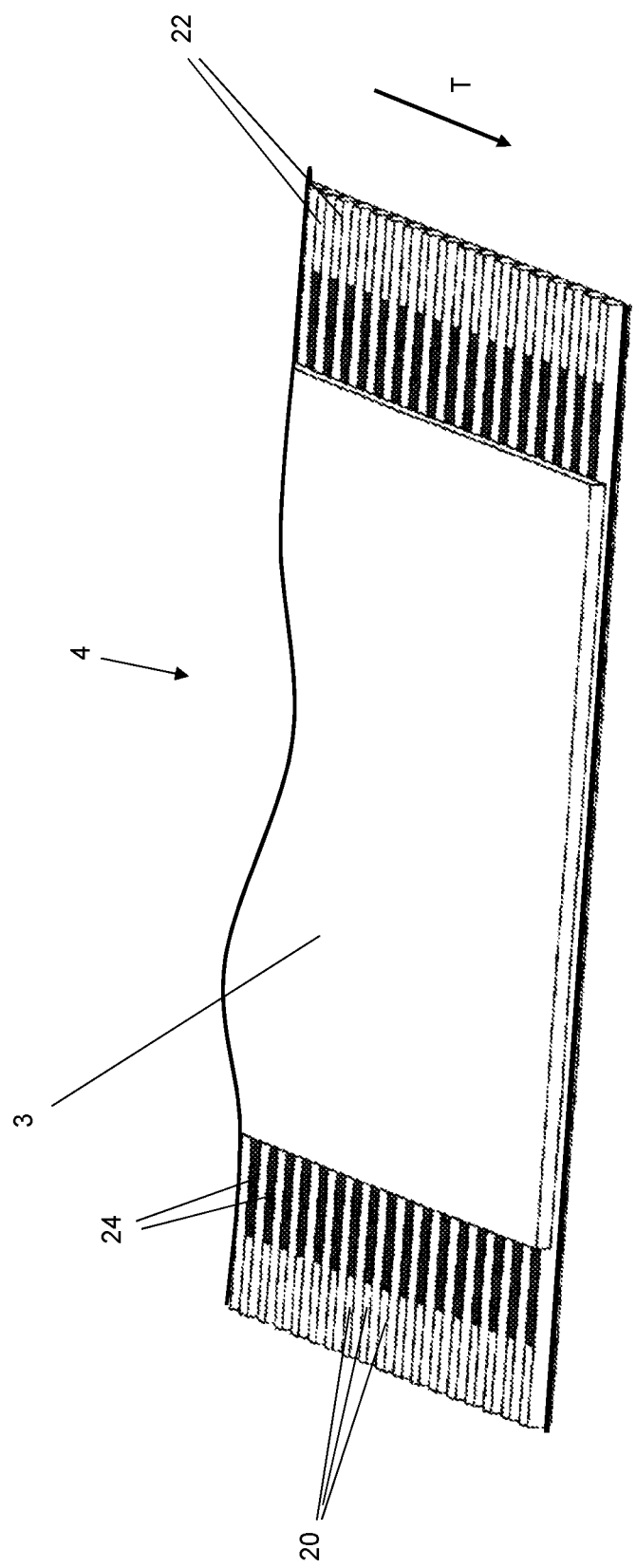
FIG. 3 shows a perspective view of part of an upper run of an embodiment of an output conveyor belt according to the invention.
Figure 4:
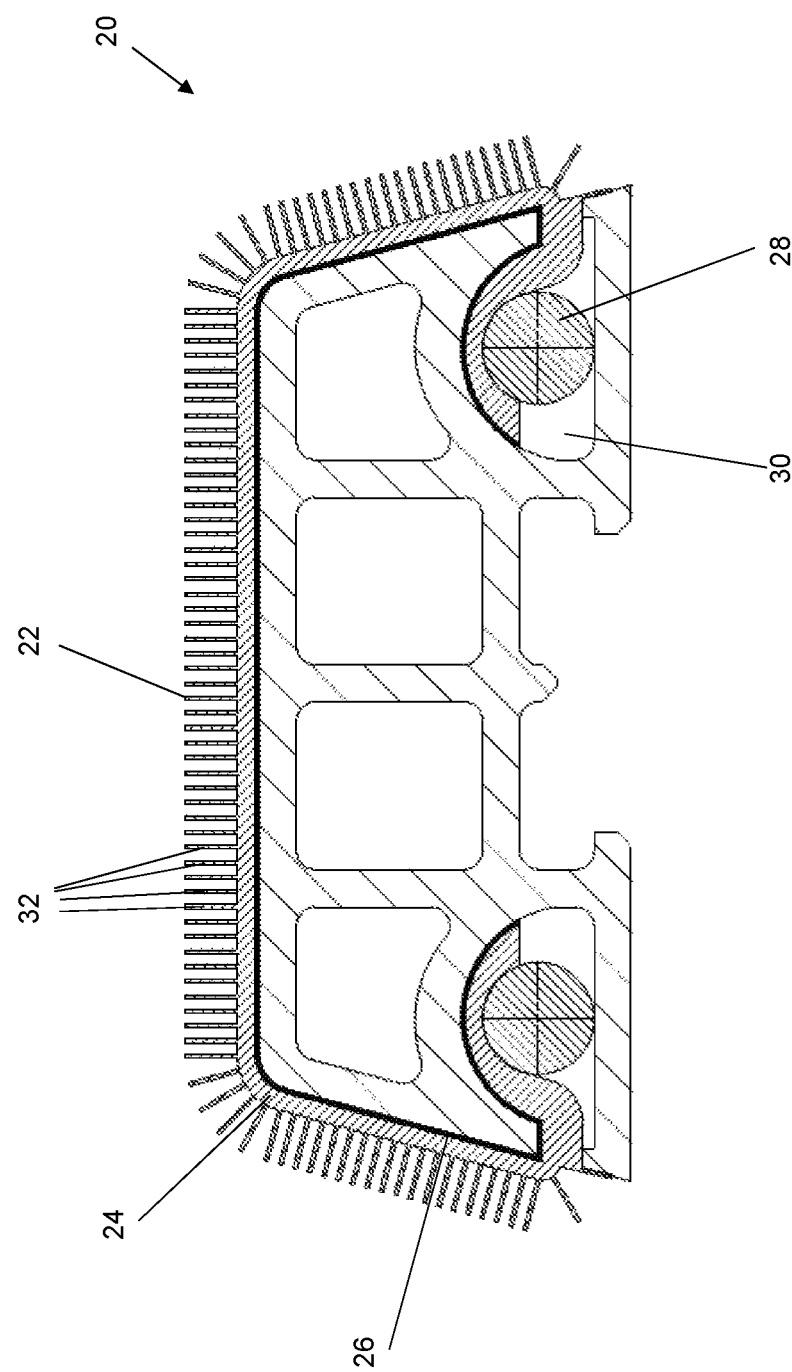
FIG. 4 is a cross-sectional view of a configuration of a transverse slat of the output conveyor belt with covering as in FIG. 3.
Figure 5:
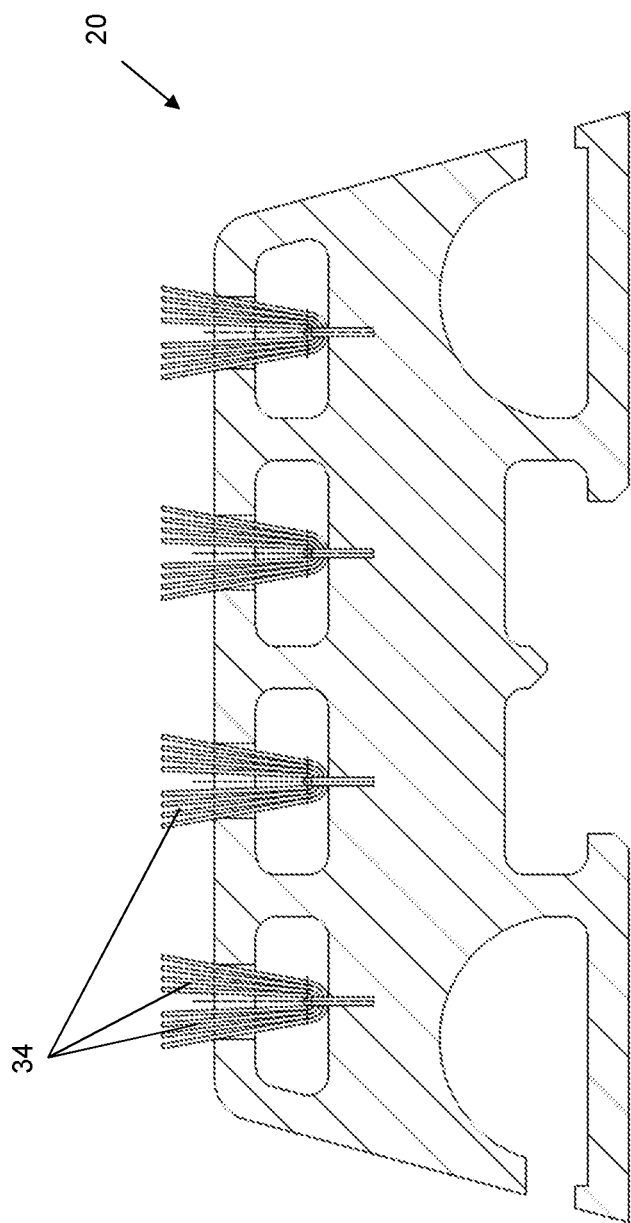
FIG. 5 is a cross-sectional view of an alternative configuration of a transverse slat of the output conveyor belt with bristle bundles.

A first embodiment of output conveyor belt 4 according to the invention used for this purpose is illustrated in FIGS. 3 and 4. Another embodiment is shown in FIG. 5.

FIG. 3 shows part of the upper run of endless output conveyor belt 4. Output conveyor belt 4 is configured as an endless slatted belt with a plurality of transverse slats 20. Transverse slats 20 are preferably made of plastic.

The nonwoven 3 lies on the support surfaces 22 of transverse slats 20 in the area of the upper run of output conveyor belt 4. Each of the support surfaces 22 of transverse slats 20 is covered by a covering 24, which is shown in black in FIG. 3. At the outermost edge areas of output conveyor belt 4, there are usually strips onto which a nonwoven 3 is not laid. Here there is no need for covering 24, as shown in FIG. 3. It is also conceivable that the transverse slats 20 could be covered by covering 24 over their entire length.

Finally, it is also conceivable that a covering 24 could be present in outer areas of the transverse slats 24, possibly aside from unused edge strips, whereas no covering 24 is provided in a middle area of transverse slats 20. The free middle area extends over no more than 70% of the width of output conveyor belt 4. Nonwoven 3 lies on and is held by covering 24 both by friction and by positive interlocking.

In other embodiments, not every transverse slat 20 needs to be provided with a covering 24. This is advantageous for economic reasons. Instead, it is possible for only every second, third, fourth, or fifth transverse slat 20 to be provided with a covering 24.

Output conveyor belt 4 is usually connected to at least one drive roller (not shown) by a toothed engagement and also travels around deflecting rollers. In an area of output conveyor belt 4 outside the nonwoven laying section, preferably in the area of the lower run of output conveyor belt 4, a cleaning device (not shown) for removing adhering fibers of nonwoven 3 is preferably arranged. The cleaning device can, for example, comprise a brush roller and/or a suction device.

Transverse slats 20 are covered at least partially by a covering 24, which comprises projecting fibers 32. Covering 24 could also comprise projecting bristles. In this way, at least certain areas of support surfaces 22 of at least some of transverse slats 20 are formed by the fibers 32 or bristles projecting from transverse slats 20. Covering 24 usually comprises a backing layer 26, from which the fibers 32 or bristles project.

In most cases covering 24 thus comprises fibers 32, possibly also in the form of filaments or yarns, which extend from backing layer 26 and project into the third dimension. In especially preferred embodiments, the material of covering 24 is a "pile fabric". Pile fabric generally comprises at least some vertically oriented fibers 32 and/or fibers 32 with a "nap" (slanted orientation). Velvets and velour materials, for example, are examples of pile fabrics.

Coverings 24 which can also be considered include Raschel materials, tufted materials, woven materials, or knitted or machine-knitted materials, provided that fibers 32 project upward from them.

Finally, it is also conceivable that projecting fibers 32 could be applied in the form of a fiber flocking to backing layer 26. In this case, plastic, wood, metal, or a textile layer can be considered as backing material.

All of fibers 32 are short fibers, which project from backing layer 26 over a distance in the range of 0.5-5 mm, preferably over a distance of 1.0-4.0 mm.

Bristles, however, are considerably longer and project from backing layer 26 over a distance in the range of 5-50 mm.

FIG. 4 shows an example of one possible way in which covering 24 can be attached to a transverse slat 20 of output conveyor belt 4. Covering 24 is attached by adhesion to transverse slat 20 by adhesive layer provided on backing layer 26. In addition, covering 24 is also held positively in place by a sealing cord 28 fitted into recesses 30 in transverse slat 20.

It is obvious that the skilled person will be aware of many other options for attaching covering 24 to transverse slat 20. For example, it can be attached by an adhesive only, by screws, or by both screws and an adhesive.

FIG. 5 shows an alternative embodiment of a transverse slat 20, in which bristles 34 in the form of bristle bundles are attached directly to transverse slat 20. When bristles 34 are used, therefore, it is not necessary for a backing layer 26 to be present. The bristle bundles can be attached to the transverse slat by mechanical fixation and/or adhesion. It is important that a sufficient number of bristles be provided in a density sufficient to ensure that support surface 22 formed by bristles 34 for the nonwoven does not allow nonwoven 3 to sag too much.

Bristles 34 project from transverse slat 20 over a distance in the range of 5-50 mm.

The invention claimed is:

1. An output conveyor belt of a crosslapper for holding and conveying layers of card web laid to form a nonwoven,
   wherein the output conveyor belt is configured as an endless slatted belt with a plurality of transverse slats, wherein the transverse slats comprise support surfaces for the nonwoven, and
   wherein at least certain areas of the support surfaces of at least some of the transverse slats are formed by fibers projecting from the transverse slats;
   wherein the transverse slats are covered at least partially by a covering, which comprises projecting fibers and the covering is formed of pile fabric with projecting fibers.

2. The output conveyor belt according to claim 1 wherein the covering comprises a backing layer, from which the fibers or bristles project.

3. The output conveyor belt according to claim 2 wherein the fibers project from the backing layer over a distance in the range of 0.5-5 mm.

4. The output conveyor belt according to claim 1 wherein the pile fabric is a velvet or a velour.

5. The output conveyor belt according to claim 2 wherein the fibers are applied in the form of fiber flocking to the backing layer.

6. The output conveyor belt according to claim 2 wherein the backing layer comprises at least one adhesive layer.

7. The output conveyor belt according to claim 1 wherein each transverse slat is covered by the covering.

8. The output conveyor belt according to claim 1 wherein every second or every third transverse slat is covered by the covering.

9. The output conveyor belt according to claim 1 wherein the transverse slats are equipped with the fibers or bristles over an entire width of the output conveyor belt.

10. The output conveyor belt according to claim 1 wherein the transverse slats comprise a covering in outer areas of the output conveyor belt, whereas the transverse slats are not covered by the covering in a middle area.

11. The output conveyor belt according to claim 10 wherein the middle area not provided with the covering extends over no more than 70% of the width of the output conveyor belt.

12. The output conveyor belt according to claim 10 wherein the middle area not provided with the covering extends over no more than 60% of the width of the output conveyor belt.

13. The output conveyor belt according to claim 10 wherein the middle area not provided with the covering extends over no more than 50% of the width of the output conveyor belt.

* * * * *